(12) United States Patent
Lee et al.

(10) Patent No.: US 8,321,899 B2
(45) Date of Patent: Nov. 27, 2012

(54) SYSTEM AND METHOD FOR DELIVERING VIDEO PRODUCTS TO A SUBSCRIBER UNIT

(75) Inventors: Anne Yin-Fee Lee, Naperville, IL (US); Ronald Bruce Martin, Carol Stream, IL (US)

(73) Assignee: Alcatel Lucent, Paris (FR)

( * ) Notice: Subject to any disclaimer, the term of this patent is extended or adjusted under 35 U.S.C. 154(b) by 1561 days.

(21) Appl. No.: 10/120,038

(22) Filed: Apr. 10, 2002

(65) Prior Publication Data

US 2003/0196209 A1 Oct. 16, 2003

(51) Int. Cl.
*H04N 7/173* (2011.01)

(52) U.S. Cl. .................. 725/93; 725/116; 455/412.1

(58) Field of Classification Search ........... 725/87–120; 709/217–232; 455/517, 575.6, 3.03, 412.1, 455/418, 564–566
See application file for complete search history.

(56) References Cited

U.S. PATENT DOCUMENTS

| | | | | |
|---|---|---|---|---|
| 5,557,320 A * | 9/1996 | Krebs | | 725/114 |
| 5,606,361 A * | 2/1997 | Davidsohn et al. | | 348/14.01 |
| 5,818,825 A * | 10/1998 | Corrigan et al. | | 370/329 |
| 5,914,712 A * | 6/1999 | Sartain et al. | | 725/9 |
| 6,124,854 A * | 9/2000 | Sartain et al. | | 715/716 |
| 6,131,086 A * | 10/2000 | Walker et al. | | 705/26.41 |
| 6,222,520 B1 * | 4/2001 | Gerszberg et al. | | 715/784 |
| 6,263,505 B1 * | 7/2001 | Walker et al. | | 725/110 |
| 6,463,270 B1 * | 10/2002 | Chang et al. | | 455/403 |
| 6,484,148 B1 * | 11/2002 | Boyd | | 705/14.64 |
| 6,546,005 B1 * | 4/2003 | Berkley et al. | | 370/353 |
| 6,584,309 B1 * | 6/2003 | Whigham | | 455/414.1 |
| 6,584,613 B1 * | 6/2003 | Dunn et al. | | 725/122 |
| 6,802,077 B1 * | 10/2004 | Schlarb | | 725/104 |
| 6,956,833 B1 * | 10/2005 | Yukie et al. | | 370/328 |
| 7,003,583 B2 * | 2/2006 | Cho et al. | | 709/245 |
| 7,035,620 B2 * | 4/2006 | Ben-Efraim et al. | | 455/412.1 |
| 7,149,549 B1 * | 12/2006 | Ortiz et al. | | 455/566 |
| 7,653,687 B2 * | 1/2010 | Reisman | | 709/203 |
| 7,669,762 B2 * | 3/2010 | Hutchison et al. | | 235/383 |
| 2001/0056474 A1 * | 12/2001 | Arai | | 709/217 |
| 2002/0078176 A1 * | 6/2002 | Nomura et al. | | 709/219 |
| 2003/0070174 A1 * | 4/2003 | Solomon | | 725/98 |
| 2003/0140004 A1 * | 7/2003 | O'Leary et al. | | 705/39 |
| 2005/0028208 A1 * | 2/2005 | Ellis et al. | | 725/58 |
| 2006/0288374 A1 * | 12/2006 | Ferris et al. | | 725/62 |

\* cited by examiner

*Primary Examiner* — Annan Shang
(74) *Attorney, Agent, or Firm* — Carmen Patti Law Group, LLC

(57) ABSTRACT

A system for delivering video products to a subscriber unit includes: (a) at least one subscriber unit equipped for processing video signals; (b) a telecommunication network coupled with the at least one subscriber unit; and (c) at least one video provider station coupled with the telecommunication network. Each respective video provider station is responsive to a predetermined call code for providing a predetermined video product to a particular subscriber unit via the telecommunication network.

9 Claims, 2 Drawing Sheets

SYSTEM AND METHOD FOR DELIVERING VIDEO PRODUCTS TO A SUBSCRIBER UNIT

BACKGROUND OF THE INVENTION

The present invention is directed to a system and method for delivering video products to a subscriber unit. The preferred embodiment of the present invention contemplates delivery of video clips to a subscriber unit in a telecommunication network. The subscriber unit may be any communication unit configured for handling video information, such as a personal digital assistant (PDA), a wireless telephone or a desktop personal computer (PC) or telephone instrument.

By way of example, the present invention provides a system and method for providing access by a wireless Internet protocol (IP) capable device to multimedia material, such as a video segment or clip, via a phone call or similar dynamic session. Examples of the types of video products or segments that may be accessed include movie trailers, news, animated cartoon segments, and other video products.

There is no direct availability for such video products by wireless devices without browsing or otherwise navigating a website or similar service provider. It would be advantageous for advertisers and other offerors of video products to be able to provide easy and direct access to their messages by wireless subscribers to a telecommunication network.

SUMMARY OF THE INVENTION

A system for delivering video products to a subscriber unit includes: (a) at least one subscriber unit equipped for processing video signals; (b) a telecommunication network coupled with the at least one subscriber unit; and (c) at least one video provider station coupled with the telecommunication network. Each respective video provider station is responsive to a predetermined call code for providing a predetermined video product to a particular subscriber unit via the telecommunication network.

It is therefore an object of the present invention to provide a system and method for delivering video products to a subscriber unit that avails a user selected video products by wireless devices without browsing or otherwise navigating a website or similar service provider.

It is a further object of the present invention to provide a system and method for delivering video products to a subscriber unit that makes it advantageous for advertisers and other offerors of video products to provide easy and direct access to their messages by wireless subscribers to a telecommunication network.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Present availability of video clips or other video products to wireless communication devices such as wireless telephones or personal digital assistant (PDA) devices is provided from selected web pages via the Internet. Such availability of video products to wireless communication devices is limited by the number of web pages that provide video services—not all web pages provide such products. Moreover, such video product availability is available only to devices that have web communicating capability, such as devices having HTML (HyperText Markup Language) capability, and video processing capability.

It would be advantageous to be able to access a video product such as a video clip via a phone call rather than having to access an Internet web page receiving video products. Such a phone call access capability would be especially advantageous when seeking to access a video product using a wirelessly connected subscriber or calling unit, such as a PDA or a wireless telephone device.

The present invention allows Internet Protocol (IP) wireless calling devices (and wired communication devices) to access video products such as video clips by dialing or otherwise entering or calling a phone number. Further, using an SIP (Session Initiation Protocol) call control protocol permits accessing a URL (Universal Resource Locator) address.

Using the present invention, a subscriber unit that is equipped for processing video signals can directly access a given website or other video product offeror and receive video products without having to effect a browsing navigation of a website or other destination service.

Preferably overhead information associated with a call, such as routing information or other data that accompanies a call's routing through a network to its destination, will be configured to inform the destination that the calling unit is equipped for processing video signals. A destination service, such as a service that provides video products on demand for callers-in, answers the call by providing the designated video product associated with the number called. By way of example, and not by way of limitation, one may enter or call "1-800-STARWARS" to call a designated destination that will answer the call by ascertaining (from accompanying overhead routing information) that the calling unit is equipped for processing video signals. The Designated destination can subsequently download a trailer or previews relating to the latest Star Wars movie for display at the calling unit.

Figure 1:
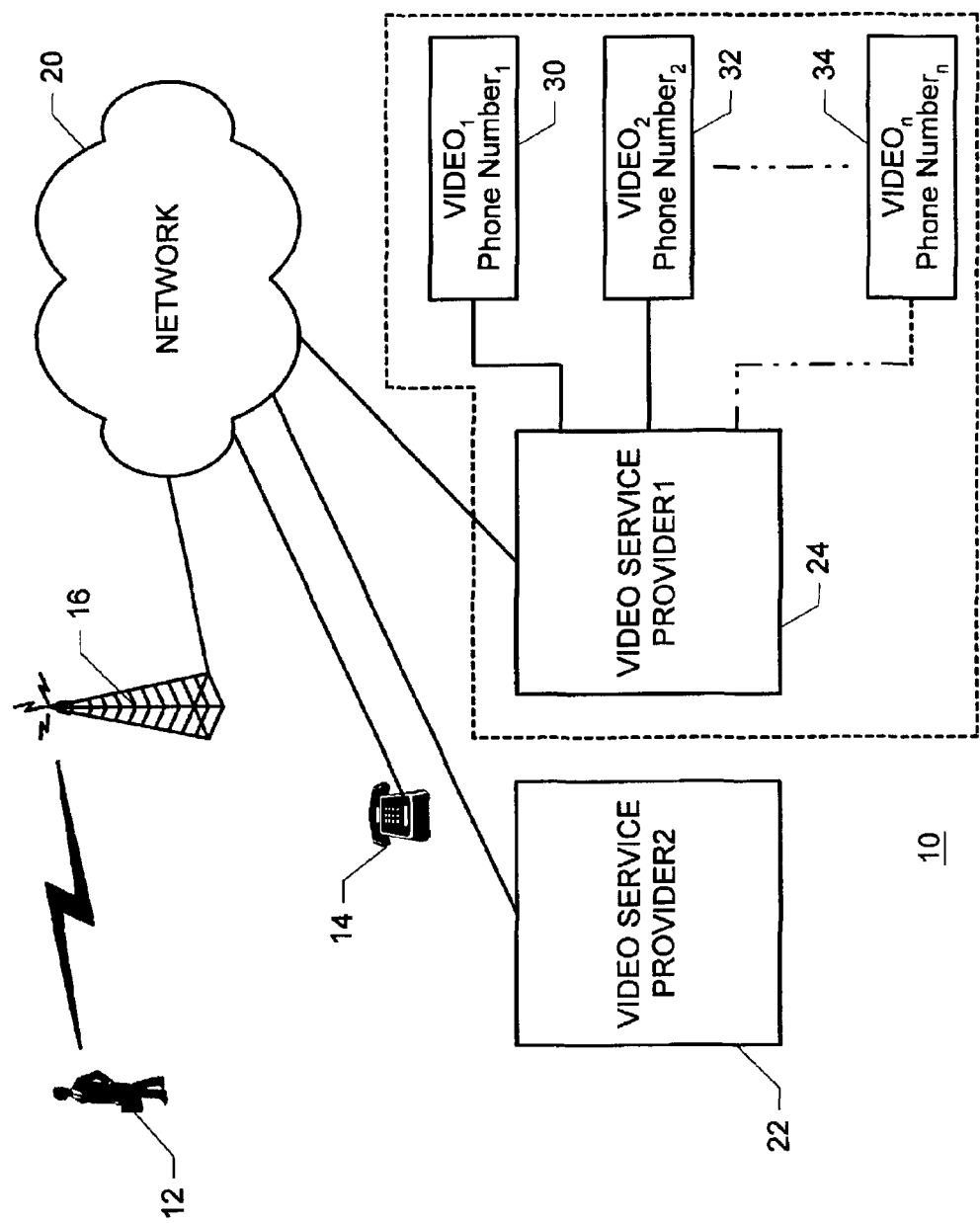
FIG. 1 is a schematic diagram illustrating the system of the present invention.

FIG. 1 is a schematic diagram illustrating the system of the present invention. In FIG. 1, a system 10 for delivering video products includes subscriber or calling units 12, 14. Subscriber unit 12 represents a wireless communication device such as a wireless-capable personal digital assistant (PDA) device or a wireless telephone device. Subscriber unit 12 is communicatingly coupled with a wireless communication access facility 16, such as a cellular telephone tower in a mobile telephone system (not shown in detail in FIG. 1). Wireless communication access facility 16 is coupled with a telecommunication network 20. Subscriber unit 114 represents a personal computer (PC) device. Subscriber unit 114 is communicatingly coupled with telecommunication network 120. Subscriber units 12, 14 are equipped for processing video signals.

Telecommunication network 20 may include any of one or more of several networks such as a public switched telephone network (PSTN) and includes virtual private networks, private networks and other limited access network configurations coupled or otherwise arranged to provide communications among a variety of devices. Exemplary devices serviced by telecommunication network 20 may include, by way of example and not by way of limitation, wired telephones, wireless telephones, personal computers (PCs), personal digital assistant (PDA) devices, mobile land radio units, and other communication devices. Coupling with telecommunication network 20 may be effected by several communication technologies and milieux including, by way of example and not by way of limitation, any mode of electronic transmission of information such as voice, data and video communications, whether delivered via systems employing digital, analog, ISDN, optical, wireline, wireless, or other delivery technologies. Also included within the contemplated technological applicability of the present invention are voice, data or video signals delivered over the Internet, via satellite communications, or via other delivery media.

Telecommunication network 20 is coupled with exemplary video service providers 22, 24. Details are provided in FIG. 1 relating to video service provider 24; similar details exist relating to web service provider 22 but are not presented in FIG. 1 in order to avoid cluttering FIG. 1. Video service providers 22,24 may be any location, site, Internet portal or other facility amenable to call-in access for providing video products, preferably in streaming video or a similar product.

Video service provider 24 is associated with a plurality of video sites 30, 32, 34. The subscript "n" is employed in FIG. 1 in connection with video sites 30, 32, 34 to indicate that there is no limit to the number of video sites that may be associated with video service provider 24. Association between video sites 30, 32, 34 and video service provider 24 is via a respective phone number assigned to or otherwise associated with each respective video site 30, 32, 34. Thus video site 30 is assigned Phone Number$_1$. Video site 32 is assigned Phone Number$_2$. Video site 34 is assigned Phone Number$_n$. That is, in order for a subscriber unit 12, 14 to access a particular video site 30, 32, 34, subscriber unit 12, 14 simply dials (or otherwise enters) a respective phone number—Phone Number$_1$, Phone Number$_2$, Phone Number$_n$—to effect connection with a video site 30, 32, 34 via telecommunication network 20 and video service provider 24.

Providing direct access to video sites 30, 32, 34 using direct dial-up connections, and providing video processing capability for subscriber units 12, 14 simplifies and reduces the memory requirement for subscriber units 12, 14 in system 10 as compared with the memory requirements associated with implementing website access over an Internet connection with a web service provider and an associated website. Such comparatively reduced memory reduces complexity of construction and operation of subscriber units 12, 14 thereby contributing to lower cost, simpler connections and increased system reliability. Connections that are less complex are less susceptible to interruption, a situation that is particularly advantageous when the connection involves a wireless segment, as between subscriber unit 12 and wireless communication access facility 16 in system 10.

Figure 2:
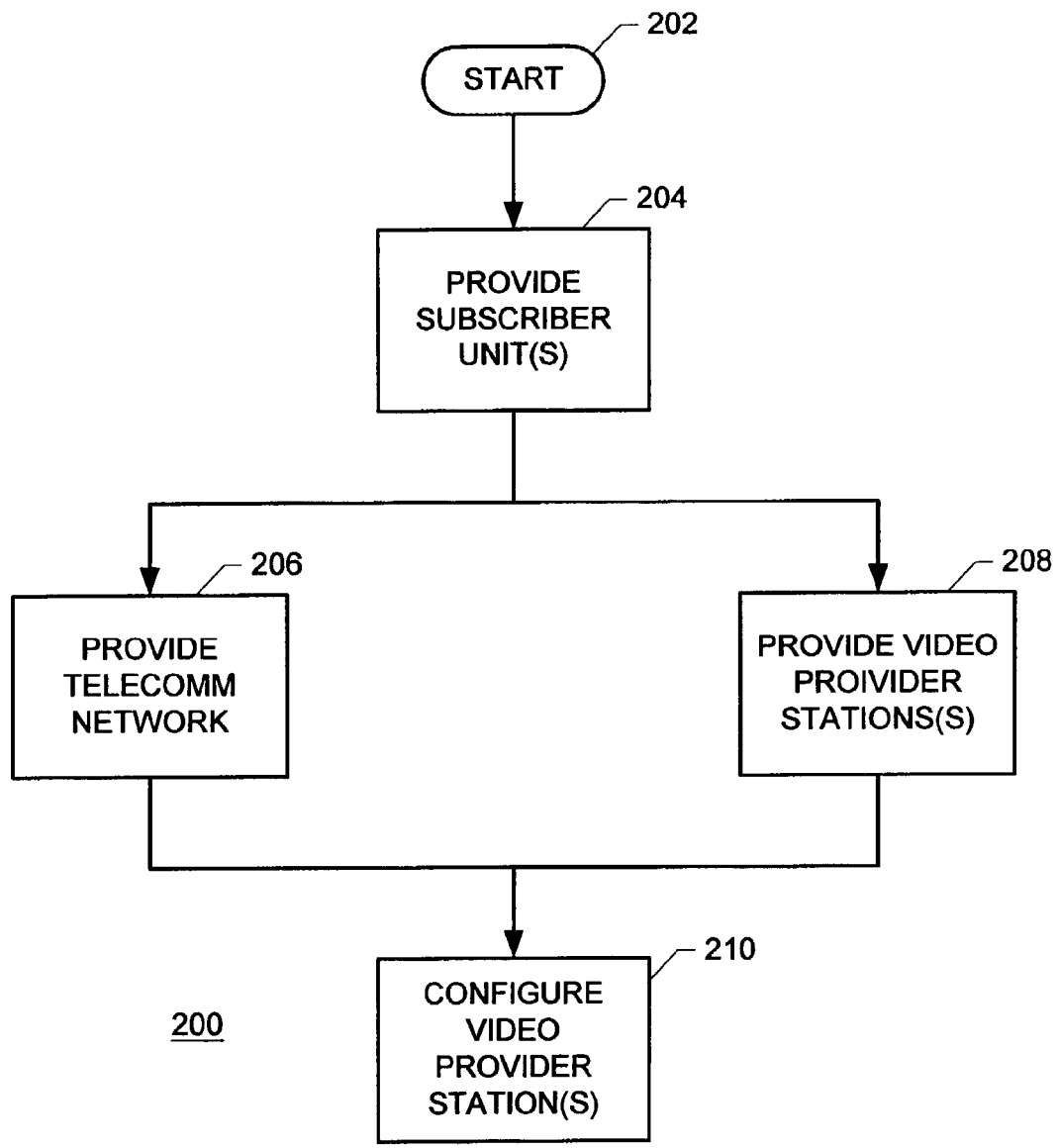
FIG. 2 is a flow diagram illustrating the system of the present invention.

FIG. 2 is a flow diagram illustrating the system of the present invention. In FIG. 2, a method 200 for delivering video products to a subscriber unit begins at a START locus 202. Method 200 continues, providing at least one subscriber unit, as indicated by a block 204. Method 200 further continues by, in no particular order: (a) providing a telecommunication network, as indicated by a block 206; and (b) providing at least one video provider station, as indicated by a block 208.

Each of the at least one subscriber station provided according to block 204 is equipped for processing video signals. The telecommunication network provided according to block 206 is coupled with the at least one subscriber unit provided according to block 204. The at least one video provider station provided according to block 208 is coupled with the telecommunication network provided according to block 206.

Method 200 continues by configuring each respective video provider station to be responsive to a predetermined call code, as indicated by a block 210. Each predetermined call code effects providing a predetermined video product to a particular subscriber unit via the telecommunication network.

The system and method of the present invention provide availability of video products to wireless communication devices such as PDA devices or wireless telephones that is simpler to use than previously available video product accessing systems or methods. Entering a phone number is simpler and less prone to mistaken entry than longer complex URL (Universal Resource Locator) addresses. Fewer mistakes in entry may be made and quicker connection to the desired video product may be accomplished using the present invention than can be effected using previously available dial-up and menu selection connections wherein a caller must listen to an audio menu presented after reaching a calling destination. After listening to an audio menu of choices, the caller enters further numbers in effecting a selection of menu items. Connection with web sites for accessing video products requires that a caller have an appropriate web viewer program installed. If an appropriate web viewing program is not installed in the subscriber unit, downloading of an appropriate web viewing program is required before any viewing can take place. The inventors contemplate that the present invention may be offered as a subscription service or as a generally available service. In such an arrangement, appropriate video viewing programs will preferably be installed in wireless devices or other subscriber units as original equipment.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A method for delivering video products to a user of a subscriber unit over a telecommunications network, the method comprising the steps of:

providing at least one video provider station coupled with said telecommunication network, said at least one video provider station associated with a plurality of video products, each video product associated with a unique phone number;

receiving, at said video provider station, a call from the user of the subscriber unit to a unique phone number associated with a video product;

establishing a direct connection between the subscriber unit and the video provider station using a session initiation protocol (SIP) message generated by the subscriber unit in response to the entry of the unique phone number by the user, and providing a video product associated with the unique phone number to the subscriber unit via said telecommunication network;

streaming the predetermined video product to the subscriber unit through the direct connection established for the call without further input by the user of the subscriber unit.

2. A method for delivering video products to a user of a subscriber unit as recited in claim 1 wherein said at least one video provider station employs overhead information associated with a call to the unique phone number to identify said particular subscriber unit as being equipped for processing video signals.

3. A method for delivering video products to a user of a subscriber unit as recited in claim 1 wherein said SIP message includes information identifying said subscriber unit as being equipped for processing video signals.

4. A method for downloading video products to a subscriber unit over a telecommunications network without entering a universal resource locator (URL) address, the method comprising the steps of:
- entering a phone number, by a user of the subscriber unit, that is uniquely associated with a video product;
- sending the phone number over the communications network to a video provider station using a session initiation protocol (SIP) message, said video provider station associated with a plurality of video products, each video product associated with a unique phone number;
- receiving, from the video provider station, a streamed video product during a direct connection established for the call; and
- displaying, on the subscriber unit, the received video product associated with the phone number entered by the user of the subscriber unit, without further input by the user.

5. The method for downloading video products to a subscriber unit of claim 4 wherein said SIP message includes information identifying said subscriber unit as being equipped for processing video signals.

6. The method for downloading video products to a subscriber unit of claim 4 wherein said subscriber unit employs overhead information associated with a call to the unique phone number to identify said subscriber unit as being equipped for processing video signals.

7. The subscriber unit of claim 4 wherein said subscriber unit employs overhead information associated with a call to the unique phone number to identify said subscriber unit as being equipped for processing video signals.

8. A subscriber unit for downloading video products over a telecommunications network without entering a universal resource locator (URL) address, the subscriber unit adapted to perform the steps of:
- receiving a phone number, entered by a user of the subscriber unit, that is uniquely associated with a video product;
- sending the phone number over the communications network to a video provider station using a session initiation protocol (SIP) message, said video provider station associated with a plurality of video products, each video product associated with a unique phone number;
- receiving, from the video provider station, a streamed video product during a direct connection established for the call; and
- displaying, on the subscriber unit, the received video product associated with the phone number entered by the user of the subscriber unit, without further input by the user.

9. The subscriber unit of claim 8 wherein said SIP message includes information identifying said subscriber unit as being equipped for processing video signals.

\* \* \* \* \*